US006950665B2

(12) United States Patent
Swift et al.

(10) Patent No.: US 6,950,665 B2
(45) Date of Patent: Sep. 27, 2005

(54) METHODOLOGY AND SYSTEM FOR GENERATING A THREE-DIMENSIONAL MODEL OF INTERFERENCE IN A CELLULAR WIRELESS COMMUNICATION NETWORK

(75) Inventors: Lawrence W. Swift, Germantown, MD (US); Sergey Dickey, Fairfax, VA (US)

(73) Assignee: PCTel, Inc., Milpitas, CA (US)

( * ) Notice: Subject to any disclaimer, the term of this patent is extended or adjusted under 35 U.S.C. 154(b) by 122 days.

(21) Appl. No.: 10/714,789

(22) Filed: Nov. 17, 2003

(65) Prior Publication Data

US 2004/0110518 A1 Jun. 10, 2004

Related U.S. Application Data

(63) Continuation-in-part of application No. 09/795,225, filed on Feb. 28, 2001.

(60) Provisional application No. 60/185,805, filed on Feb. 29, 2000.

(51) Int. Cl.[7] .............................................. H04B 15/00

(52) U.S. Cl. .................... 455/501; 455/500; 455/67.11; 455/67.12; 455/67.13; 455/67.14; 455/63.1; 455/39; 455/403; 375/132; 375/133

(58) Field of Search ................................ 455/501, 500, 455/67.11–67.14, 63.1, 39, 403; 375/132, 133

(56) References Cited

U.S. PATENT DOCUMENTS

| | | | | | |
|---|---|---|---|---|---|
| 5,179,722 | A | | 1/1993 | Gunmar et al. | 455/33.1 |
| 5,511,233 | A | * | 4/1996 | Otten | 455/524 |
| 5,850,600 | A | * | 12/1998 | Dixon | 455/422.1 |
| 6,097,957 | A | * | 8/2000 | Bonta et al. | 455/446 |
| 6,137,991 | A | | 10/2000 | Isaksson | 455/67.1 |
| 6,349,207 | B1 | | 2/2002 | Monot et al. | 455/423 |
| 6,356,763 | B1 | | 3/2002 | Kangas et al. | 455/456 |
| 6,418,175 | B1 | | 7/2002 | Pukkila et al. | 375/347 |
| 6,470,185 | B2 | | 10/2002 | Kangas et al. | 455/456 |
| 6,480,718 | B1 | | 11/2002 | Tse | 455/446 |
| 6,631,267 | B1 | * | 10/2003 | Clarkson et al. | 455/446 |
| 6,671,309 | B1 | * | 12/2003 | Craig et al. | 375/132 |
| 2001/0034208 | A1 | | 10/2001 | Kline et al. | 455/67.1 |
| 2001/0044311 | A1 | | 11/2001 | Larsson et al. | 455/456 |
| 2002/0004400 | A1 | | 1/2002 | Fischer et al. | 455/456 |
| 2002/0118730 | A1 | | 8/2002 | Svensson et al. | 375/150 |
| 2003/0171132 | A1 | | 9/2003 | Ho et al. | 455/522 |
| 2003/0174671 | A1 | | 9/2003 | Chen | 370/329 |
| 2003/0186712 | A1 | * | 10/2003 | Tillotson | 455/501 |

FOREIGN PATENT DOCUMENTS

| | | |
|---|---|---|
| WO | WO 01/59936 | 8/2001 |

OTHER PUBLICATIONS

"Full–coverage, mobile and automatic measurement of GSM interference", GSM Interference Analyzer ROGER (TS9958); News from Rohde & Schwarz #168 (2000/III).

"Interference in Mobile Cellular CDMA Forward Traffic Channels"; A.L. Garrett, T.G. MacDonald, D.L. Noneaker, M.B. Pursley, J.M. Shea; Clemson University, SC.

(Continued)

*Primary Examiner*—Sonny Trinh
*Assistant Examiner*—Khai Nguyen
(74) *Attorney, Agent, or Firm*—Gordon & Jacobson, PC

(57) ABSTRACT

A method (and system) for quantifying a three-dimensional model of interference in a cellular wireless communication network. The model is derived from the acquisition and analysis of composite signals as part of a survey of ground-level locations and above-ground-level locations within the intended coverage zone of the cellular wireless communication network. Reliable identification and correlation of signal components are derived by analysis of the acquired composite signals that uses time-of-arrival of a known part of a signal (e.g., the FCCH burst used in GSM for frequency correction).

27 Claims, 4 Drawing Sheets

OTHER PUBLICATIONS

"Simulation software accelerates in–building deployment"; Wireless Web;Sep. 23, 2003 Author: Michael Kuhn.

"From the Inside Out:Vendor Guides Carriers Toward Indoor Coverage" Telephony.Online; Telephony, Jan. 26, 1998.

"Optimizing In–Building Coverage"; Wireless Review, Mar. 1, 1998 Authors: James Kobielus, Gray Somerville and Todd Baylor.

"Deployment, Optimization, and Maintenance of UMTS Networks with Wizard", Agilent Technologies, Copyright 2000.

"Simulation Results for Parallel GSM Synchronisation"; TSG–RAN Working Group 1 Meeting #4; Yokohama, Japan; Apr. 19–20, 1999; Source: Siemens.

* cited by examiner

METHODOLOGY AND SYSTEM FOR GENERATING A THREE-DIMENSIONAL MODEL OF INTERFERENCE IN A CELLULAR WIRELESS COMMUNICATION NETWORK

CROSS-REFERENCE TO RELATED APPLICATIONS

The present application is a continuation-in-part of U.S. application Ser. No. 09/795,225 filed on Feb. 28, 2001, which claims priority to provisional U.S. Application No. 60/185,805, filed on Feb. 29, 2000, herein incorporated by reference in its entirety.

BACKGROUND OF THE INVENTION

1. Field of the Invention

This invention relates broadly to cellular wireless communication networks. More particularly, this invention relates to a methodology and systems for identification and measurement of interference in such cellular wireless communication networks.

2. State of the Art

Because cellular wireless communication networks re-use frequency across geographic areas, all cellular wireless communication networks contain interference (both co-channel and adjacent channel). Wireless protocols (AMPS, IS-136, CDMA, WCDMA, GSM . . . ) all take this into consideration. However, it is important for network carriers to manage interference to its minimum possible levels because interference within a network reduces capacity (the number of subscribers, or amount of data, a network can accommodate). Thus, to maximize the amount of revenue a network can generate and to minimize the capital expenditures necessary to support that revenue (i.e. purchasing new base stations), it is critical that the network interference be minimized.

The current solutions for optimizing cellular wireless telephone networks involve a process of gathering network data and processing that data to determine the best possible optimization of network variables to minimize interference. The data can come from a number of sources, but drive testing is the most accurate. Drive testing is the process of driving the roads in a given market with a piece of test equipment that typically includes a laptop computer integrated with a wireless handset, a GPS receiver and a demodulating scanning receiver. Once the drive test data is collected, the data is typically provided to post-processing tools which apply various mathematical algorithms to the data to accomplish network planning and optimization. An example of post-processing is automatic frequency planning (AFP), where the data is processed to determine the optimal arrangement of frequencies to cell site sectors to minimize network interference. Another post-processing application is automatic cell planning (ACP) which analyzes network variables to aid network engineers in making decisions on how best to minimize interference in the network. These network variables include: the frequencies (for FDMA networks) or pilot numbers (for CDMA networks) per cell site sector, the cell site antenna's height and/or angle, the cell site sector's transmission power, cell site locations or new cell site locations, and a host of other variables that impact radio frequency propagation.

The problem with the current methodologies is that the drive-test data is all collected at ground level, creating a two-dimensional data set. This data is then processed to minimize interference for a two-dimensional model. However, because many users of the wireless communication network are not at ground level, but rather above ground level in buildings, these "optimized" solutions fail to account for above ground level usage. This is particularly true for urban environments.

SUMMARY OF THE INVENTION

It is therefore an object of the invention to provide a methodology and system for accurately quantifying a three-dimensional model of interference in a cellular communication network, wherein the three-dimensional model characterizes network interference at various levels above ground-level.

It is another object of the invention to provide accurate locations of interfering sources (e.g., base stations) as measured from a plurality of ground-level locations as well as a plurality of above-ground-level locations.

It is a further object of the present invention to provide such accurate locations of interfering sources (e.g., base stations) without the need for carrying out complex decoding operations with respect to the radio frequency signals generated by the wireless communication network.

It is an additional object of the present invention to provide such accurate locations of interfering sources (e.g., base stations) based upon time-of-arrival of a known part of a signal (e.g., the FCCH burst used in GSM for frequency correction).

In accord with these objects, which will be discussed in detail below, a three-dimensional model of interference in a cellular wireless communication network is quantified. The model is derived from the acquisition and analysis of composite signals as part of a survey of ground-level locations and above-ground-level locations within the intended coverage zone of the cellular wireless communication network. Reliable identification and correlation of signal components are derived by analysis of the acquired composite signals that use time-of-arrival of a known part of a signal (e.g., the FCCH burst used in GSM for frequency correction).

It will be appreciated that the three-dimensional model of interference generated and stored in accordance with the present invention enables optimization of network in the vertical dimension, and thus enables improved optimization of coverage and capacity, especially in urban environments.

According to a preferred embodiment of the invention, interfering signal components measured as part of a survey of ground-level locations are correlated with interfering signal components measured as part of a survey of above-ground-level locations using synchronized timing references to thereby generate a three-dimensional model that depicts a unified representation of the interference sources over a three-dimensional space that encompasses the intended coverage zone of the cellular wireless network.

Additional objects and advantages of the invention will become apparent to those skilled in the art upon reference to the detailed description taken in conjunction with the provided figures.

DETAILED DESCRIPTION OF THE PREFERRED EMBODIMENTS

In accordance with the present invention, a three-dimensional model of interference in a cellular wireless communication network is quantified. The model is derived from the acquisition and analysis of composite signals as part of a survey of ground-level locations and above-ground-level locations within the intended coverage zone of the cellular wireless communication network. Reliable identification and correlation of signal components are derived by analysis of the acquired composite signals that use time-of-arrival of a known part of a signal (e.g., the FCCH burst used in GSM for frequency correction). A methodology according to an exemplary embodiment of the present invention is described as follows.

As part of the methodology, one or more wireless data acquisition devices sample relevant frequency bands utilized by the network at a plurality of ground-level locations and at a plurality of above-ground-level locations that are within the intended coverage zone of the network. For example, the ground-level locations may be a plurality of measurement points during the course of a test drive that surveys the intended coverage zone of the wireless communication network, while the above-ground-level locations may be measurement points at various places (such as at the center and exterior corners of every fourth floor) within buildings that are located within the intended coverage zone of the network. The relevant frequency bands will vary depending upon the architecture of the system. For example, in GSM networks, the relevant frequency bands include the 124 carrier frequency bands, each 200 KHz in width, between 935 MHz and 960 MHz. These frequency bands are used for downlink communication from a base station to a mobile unit in a GSM network. The composite signals, which are measured by the wireless data acquisition device over the network locations and within each respective sampled frequency band, are analyzed to identify and correlate signal components therein. For simplicity of description, the data collection and data analysis operations of the composite signals pertaining to a single sampled carrier frequency band is set forth below in blocks 101–123. One skilled in the art will realize that such data analysis operations will be performed for a plurality of sampled frequency bands as part of the desired network optimization operations.

Figure 1A:
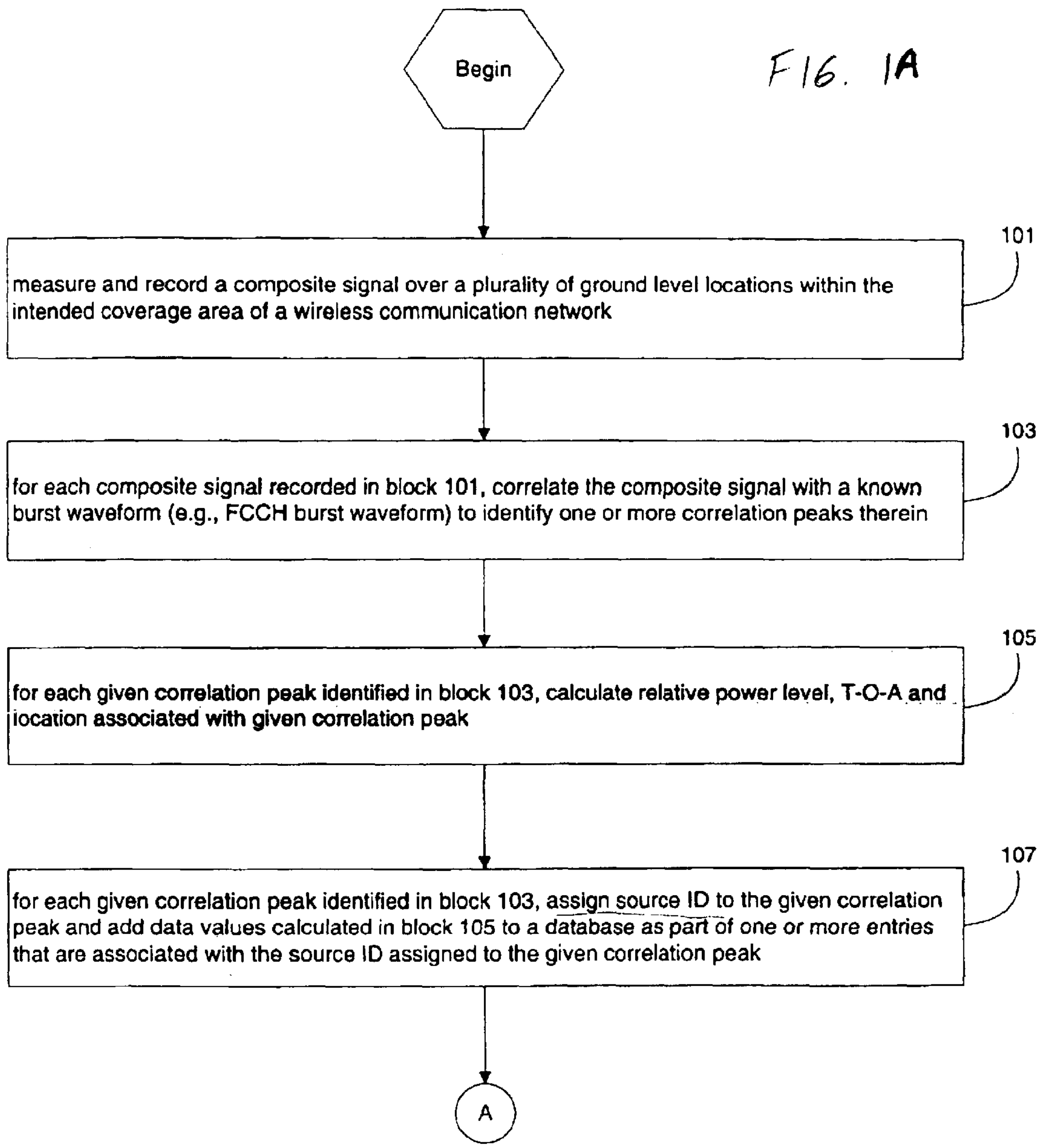
FIGS. 1A and 1B, together, are a flowchart describing wireless data acquisition and analysis operations for modeling interference in a 3-dimensional space covered by a cellular wireless communication network in accordance with the present invention.

Referring to FIG. 1A, the methodology begins in block 101 wherein a mobile wireless data acquisition device (which is tuned to receive signals within a particular carrier frequency band) is moved over a plurality of ground-level locations within the intended coverage zone of the cellular wireless communication network. At each ground level location, the composite signal received by the wireless data acquisition device is measured and recorded.

In block 103, each composite signal collected in block 101 is correlated with a known burst waveform (e.g., FCCH burst waveform) to identify one or more correlation peaks therein. Each correlation peak is referred to herein as a "component." Note that the FCCH burst waveform, which is a 147-bit-long piece of a sine wave of fixed frequency, is well suited for such correlation because its detection can be performed even in the presence of strong signals.

Note the base stations of the GSM network utilize a BCCH control channel that has a period of 51 frames. The 51 frames are logically partitioned into a set of five "10-frames" followed by an "odd frame". Each of the five "10-frames" has one FCCH burst in a fixed position therein (the first time slot in the initial frame of the given 10-frame structure). The "odd frame" does not have an FCCH burst. In this configuration, the correlation of block 103 is preferably performed by correlating the received composite signal with an FCCH burst waveform that includes a set of five FCCH bursts spaced apart in accordance with the known BCCH control channel multi-frame structure as described above.

In block 105, relative power level, time-of-arrival and location data are calculated for each correlation peak identified in block 103. Preferably, the relative power level is derived from the magnitude of the received composite signal level at sample point(s) corresponding to the given correlation peak (e.g., derived from one or more sample points that correspond to one or more FCCH bursts in the correlated FCCH waveform), the time-of-arrival is referenced to a timing reference signal generated by an internal time-based generator in the wireless data acquisition device, and the location data is provided by GPS position of the wireless data acquisition device at a point in time cotemporaneous with the measurement of that part of the composite signal from which the given correlation peak is derived. Preferably, the timing reference signal generated by the internal time-based generator during the ground-level survey is synchronized to a GPS timing signal. In this configuration, GPS timing signals provide a common source of synchronization for the time-of-arrival measurements for the ground-level data as well as for the above-ground-level data collected in block 111.

In block 107, each correlation peak identified in block 103 is assigned a source identifier (referred to herein as a "source ID"). The source ID pertaining to a given correlation peak may be an old source ID in the event that the given correlation peak corresponds to a previously acquired component. Alternatively, a new source ID may be used in the event that the given correlation peak corresponds to a newly acquired component. Note that a given correlation peak corresponds to a previously acquired component in the event that the time-of-arrival data associated with the peak and the previously acquired component match. Moreover, in block 107, the relative power level, time-of-arrival and location data calculated for a given correlation peak in block 105 are added to a database as part of one or more entries that are associated with the source ID assigned to the given correlation peak.

In block 111, a mobile wireless data acquisition device (which is tuned to receive signals within the same carrier frequency band as used in block 101) is moved over a plurality of above-ground-level locations within the intended coverage zone of the cellular wireless communication network. At each above-ground-level location, the composite signal received by the wireless data acquisition device is measured and recorded.

In block 113, each composite signal collected in block 111 is correlated with a known burst waveform (e.g., FCCH burst waveform) in a manner similar to the correlation operations of block 103 to identify one or more correlation peaks therein.

In block 115, relative power level, time-of-arrival and location data are calculated for each correlation peak identified in block 113. Preferably, the relative power level is derived from the magnitude of the received composite signal level at sample point(s) corresponding to the given correlation peak (e.g., derived from one or more sample points that correspond to one or more FCCH bursts in the correlated FCCH waveform), the time-of-arrival is referenced to an internal time-based generator in the mobile wireless data acquisition device, and the location data is provided by the output of a positioning system at a point in time cotemporaneous with the measurement of that part of the composite signal from which the given correlation peak is derived.

Preferably, the positioning system is integrated into the mobile wireless data acquisition device, and includes a floor plan of the building(s) that are part of the above-ground-level survey. The floor plan, which is stored in digital format in persistent storage (e.g., hard disk drive) of the wireless data acquisition device, includes a graphical representation of the floor(s) of the buildings as well as position coordinates for predetermined locations on such floors. The positioning system also includes a graphical user interface (preferably utilizing a touch screen for stylus input) that enables the user to mark current position on the appropriate floor plan. The coordinates of the current position are derived from the stored location coordinates (preferably, utilizing well-known interpolation techniques), and supplied to the wireless data acquisition device. Other positioning systems can be used provided that such systems are capable of supplying suitable location coordinates of the wireless data acquisition device during signal collection operations.

Because it is often problematic to receive GPS signals within the interior spaces of buildings, the internal time-based generator of the mobile wireless data acquisition device preferably includes a crystal oscillator circuit that generates a timing reference signal during the above-ground-level survey that is synchronized to the GPS-based timing reference signal generated during the ground-level survey. In order to provide such synchronization, the initial operation of the crystal oscillator circuit is synchronized to a GPS timing signal. This initial synchronization may occur outside a building (typically at or near ground-level prior to performing the above-ground-level survey for the building) or near a window inside a building. Once synchronized, the crystal oscillator circuit maintains an accurate timing reference which is synchronized to the timing reference used during the ground-level survey. In this manner, GPS timing signals provide a common source of synchronization for the time-of-arrival measurements for the ground-level data as well as for the above-ground-level data collected in block 111. For such purposes, a crystal oscillator of high stability may be used to realize the internal time signal generator of the mobile wireless data acquisition device. Alternatively, a rubidium standard timing signal generator or any other high stability timing reference may be used.

Note that the initial synchronization operation of the internal timing signal generator of the mobile wireless data acquisition device to the GPS timing signal can be performed periodically (in the event that the GPS timing signal is available) in order to reduce residual drift of the reference timing signal generated by the internal timing signal generator.

In block 117, each correlation peak identified in block 113 is assigned a source ID. The source ID pertaining to a given correlation peak may be an old source ID in the event that the given correlation peak corresponds to a previously acquired component. Alternatively, a new source ID may be used in the event that the given correlation peak corresponds to a newly acquired component. Note that a given correlation peak corresponds to a previously acquired component in the event that the time-of-arrival data associated with the peak and the previously acquired component match. Moreover, in block 117, the relative power level, time-of-arrival and location data calculated for the given correlation peak are added to a database as part of one or more entries that are associated with the source ID assigned to the given correlation peak.

In block 119, for each given source ID assigned in blocks 107 and 117, estimated coordinates of the source (e.g., base station location) that corresponds to the given source ID are generated. Preferably, the estimated coordinates corresponding to a given source ID are generated using the time-of-arrival and location data associated with the given source ID in blocks 107 and 117. Such calculations may be based upon two difference-of-time-of-arrival data points during the course of the data acquisition survey as is well known in the navigation arts. The estimated coordinates of the source are added to the database as part of one or more entries that are associated with the given source ID.

In block 121, optionally, the source IDs utilized in the processing operations of blocks 109 and 119 are correlated to identify sets of source IDs, wherein the source IDs belonging to a given set correspond to a common source (e.g., the estimated coordinates associated with the source IDs of the set fall within a tolerance interval). The database is updated such that the information (e.g., relative power level values) associated with each set of source identifiers is associated with the common source.

Finally, in block 123, the information stored in the database, including the relative power levels (within the particular carrier frequency band) for the interfering signal components over the surveyed ground-level locations and above-ground-level locations, is used for network optimization, such as automatic frequency planning or automatic cell planning.

Figure 2:
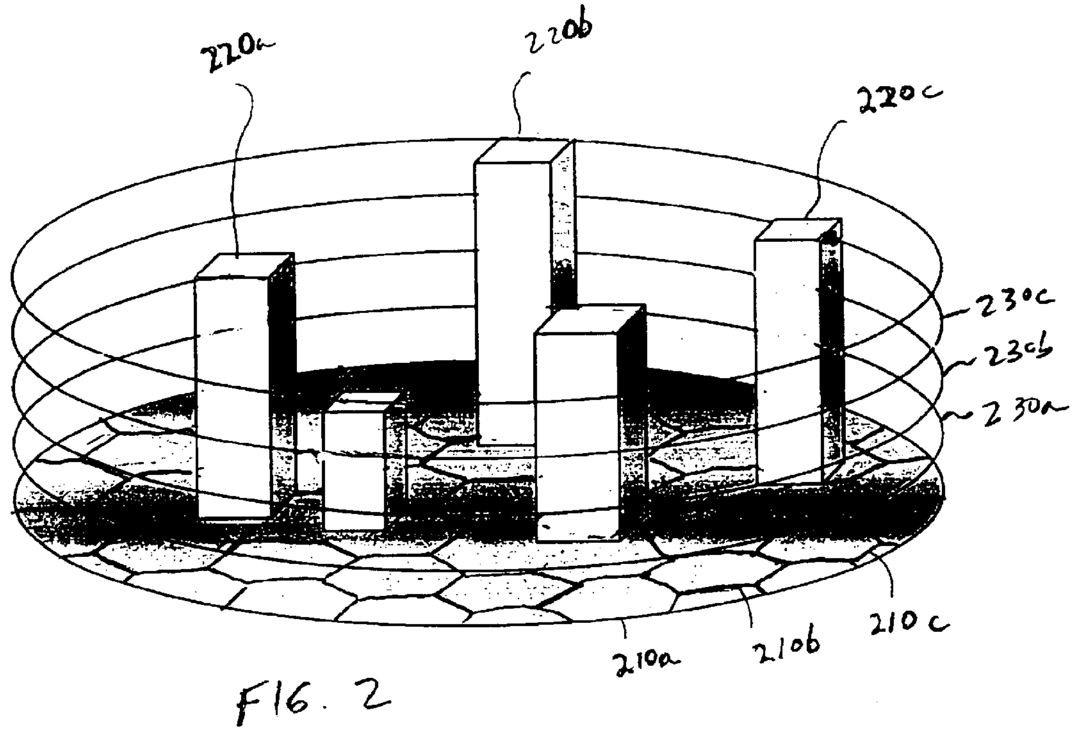
FIG. 2 is a schematic diagram illustrating the three-dimensional structure of a model of network interference, which is generated in accordance with the operations of FIGS. 1A and 1B.

A spatial model of the information stored in the database is shown in FIG. 2 where various cells 210*a*, 210*b*, 210*c*, . . . as well as various buildings 220*a*, 220*b*, 220*c*, . . . and various height levels 230*a*, 230*b*, 230*c* are shown. Importantly, the model provides information that characterizes the source of interference at various height levels of a three dimensional space that encompasses the intended coverage zone of the network. By incorporating such three-dimensional data into network planning and optimization, interference can be minimized in this three-dimensional space. In this manner, the network is "optimized" for usage at ground-level as well as usage above-ground-level. This is particularly advantageous for optimizing network in urban environments.

Figure 1B:
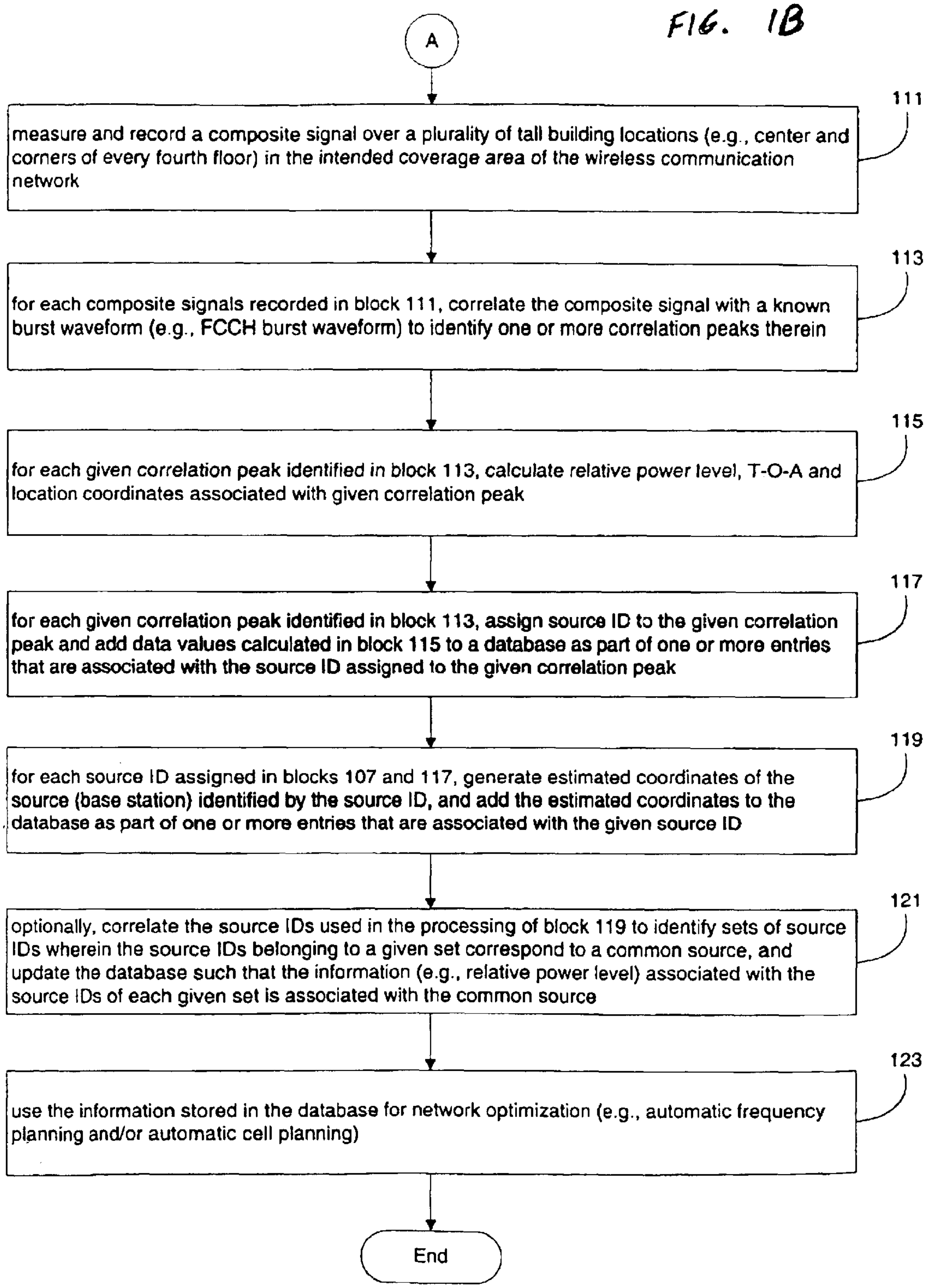
Figure 3:
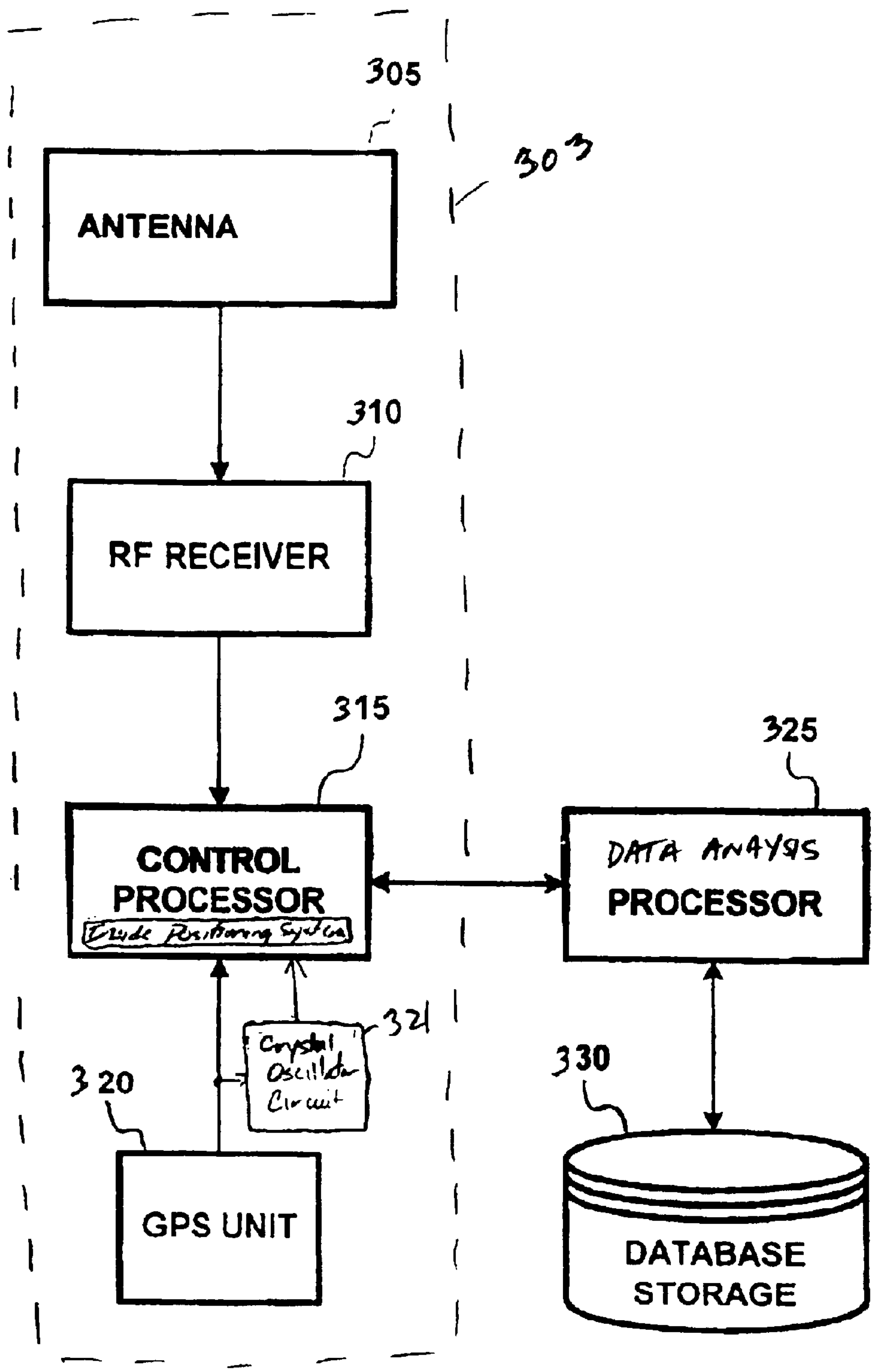
FIG. 3 is a block diagram of the components of a wireless data acquisition and analysis system for carrying out the operations of FIGS. 1A and 1B in accordance with the present invention.

Referring to FIG. 3, a block diagram of the components of an exemplary system that carries out the wireless data acquisition and analysis operations of FIGS. 1A and 1B is shown. A wireless data acquisition device 303 includes an RF receiver 310 that is tuned to receive a particular carrier frequency band. The RF receiver 310 produces a composite signal (within the tuned carrier frequency band) that is received at the antenna 305. The control processor 315 receives the composite signal output from the RF receiver 310 and a GPS signal (coordinate data and time data) from an internal GPS unit 320. In addition, the control processor 315 receives a reference timing signal from a crystal oscillator circuit 321 for use in the above-ground-level survey as described above. The data to be recorded at each measurement point is directed from the control processor 315 to a data analysis processor 325 for storage in a data storage device 330. The control processor 315 also includes an in-building positioning system. As described above, the in-building positioning system preferably utilizes user interaction to identify position of the device at each measurement point in the above-ground-level survey and generates coordinate data for such measurement points. The data analysis processor 325 analyzes the data stored in the data storage device 330 to generate the three-dimensional model of interference in the network as described above with respect to FIGS. 1A and 1B, and stores the resultant data in the data storage device 330. It is also contemplated that the functionality of the control processor 315 and data analysis processor 325 may be merged into a single processing system.

There have been described and illustrated herein an illustrative embodiment of methodology (and data analysis systems based thereon) for generating a three-dimensional model of interference in a cellular wireless communication network. The model is derived from the acquisition and analysis of composite signals as part of a survey of ground-level locations and above-ground-level locations within the intended coverage zone of the cellular wireless communication network. Identification and correlation of signal components are derived by analysis of the acquired composite signals that uses time-of-arrival of a known part of a signal (e.g., the FCCH burst used in GSM for frequency correction). While particular embodiments of the invention have been described, it is not intended that the invention be limited thereto, as it is intended that the invention be as broad in scope as the art will allow and that the specification be read likewise. Thus, while the application of the methodology to particular network architecture(s) (e.g., the GSM network architecture) has been disclosed, it will be appreciated that the methodology can be readily adapted for use with any FDMA (Frequency Division Multiple Access) network. It can also be readily adapted for use in non-FDMA networks. For example, the methodology can be adapted for use in CDMA (Code Division Multiple Access) networks and WCDMA (Wideband Code Division Multiple Access) networks by performing the operations described herein over pilot numbers instead of frequencies. Moreover, while the preferred embodiment of the present invention utilizes synchronized time references generating during the ground-level survey and the above-ground-level survey, it is possible that the ground-level data and the above-ground-level data may be collected and correlated in conjunction with unsynchronized time references. In this configuration, the data may be correlated by finding similarities in the distribution of moments observed in the timing data. It will therefore be appreciated by those skilled in the art that yet other modifications could be made to the provided invention without deviating from its spirit and scope as claimed.

What is claimed is:

1. A method for characterizing interference in a cellular wireless network, the method comprising:

sampling composite signals received at a plurality of ground-level locations that are within the intended coverage zone of the cellular wireless network, and recording the received composite signals as a first set of composite signals;

correlating each composite signal within said first set of composite signals with a predetermined waveform signal to identify a first set of correlation peaks therein;

generating data representing relative power level and time-of-arrival for each correlation peak within said first set of correlation peaks, and adding said data to a database;

sampling composite signals received at a plurality of above-ground-level locations that are within the intended coverage zone of the cellular wireless network, and recording the received composite signals as a second set of composite signals;

correlating each composite signal within said second set of composite signals with said predetermined waveform signal to identify a second set of correlation peaks therein; and generating data representing relative power level and time-of-arrival for each correlation peak within said second set of correlation peaks, and adding said data to a database;

wherein time of arrival for each correlation peak within said first set of correlation peaks and time of arrival for each correlation peak within said second set of correlation peaks are derived from a plurality of synchronous time reference signals.

2. A method according to claim 1, further comprising:

assigning source identifier data to said first and second sets of correlation peaks, wherein correlation peaks with matching time-of-arrival data associated therewith share a common source identifier; and adding said source identifier data to said database.

3. A method according to claim 2, further comprising:

accessing the database for network optimization.

4. A method according to claim 3, wherein:

said network optimization comprises at least one of automatic frequency planning and automatic cell planning.

5. A method according to claim 1, wherein:

said cellular wireless network comprises an FDMA network, and the received composite signals fall within a predetermined frequency band utilized by said FDMA network.

6. A method according to claim 5, wherein:

said wireless network comprises a GSM network, and the received composite signals fall within a predetermined carrier frequency band utilized by said GSM network for downlink communication from a base station to at least one mobile unit.

7. A method according to claim 6, wherein:

said predetermined waveform signal comprises an FCCH burst waveform.

8. A method according to claim 1, wherein:

said cellular wireless network comprises a CDMA network, and the received composite signals share a common pilot number utilized by said CDMA network.

9. A method according to claim 1, wherein:

said data representing relative power level for a given correlation peak is derived from the magnitude of the received composite signal level at one or more sample points corresponding to the given correlation peak.

10. A method according to claim 2, further comprising:

generating data representing estimated location for a given source identifier based upon time-of-arrival data and location data associated with a plurality of correlation peaks corresponding to the given source identifier.

11. A method according to claim 10, wherein:

location data associated with a given correlation peak is based upon a GPS position signal generated at a point in time cotemporaneous with sampling of that part of said composite signals from which the given correlation peak is derived.

12. A method according to claim 1, wherein:

said synchronous time reference signals are derived from a GPS timing signal.

13. A method according to claim 12, wherein:

time-of-arrival data for a portion of said second set of correlation peaks are derived from a time reference signal generated by a crystal oscillator circuit that is synchronized to the GPS timing signal.

14. A system for characterizing interference in a cellular wireless network, the system comprising:

a data analysis processor that operates on a first set of composite signals and on a second set of composite signals, the first set of composite signals measured from a plurality of ground-level locations that are within the intended coverage zone of the cellular wireless network, and the second set of composite signals measured from a plurality of above-ground-level locations that are within the intended coverage zone of the cellular wireless network, the data analysis processor including means for correlating each composite signal within said first set of composite signals with a predetermined waveform signal to identify a first set of correlation peaks therein, means for generating data representing relative power level and time-of-arrival for each correlation peak within said first set of correlation peaks, and adding said data to a database, means for correlating each composite signal within said second set of composite signals with said predetermined waveform signal to identify a second set of correlation peaks therein, and means for generating data representing relative power level and time-of-arrival for each correlation peak within said second set of correlation peaks, and adding said data to a database, wherein time of arrival for each correlation peak within said first set of correlation peaks and time of arrival for each correlation peak within said second set of correlation peaks are derived from a plurality of synchronous time reference signals.

15. A system according to claim 14, further comprising:

means for assigning source identifier data to said first and second sets of correlation peaks, wherein correlation peaks with matching time-of-arrival data associated therewith share a common source identifier; and means for adding said source identifier data to said database.

16. A system according to claim 14, further comprising:

means for accessing the database for network optimization.

17. A system according to claim 16, wherein:

said network optimization comprises at least one of automatic frequency planning and automatic cell planning.

18. A system according to claim 14, wherein:

said cellular wireless network comprises an FDMA network, and the received composite signals fall within a predetermined frequency band utilized by said FDMA network.

19. A system according to claim 18, wherein:

said wireless network comprises a GSM network, and the received composite signals fall within a predetermined carrier frequency band utilized by said GSM network for downlink communication from a base station to at least one mobile unit.

20. A system according to claim 19, wherein:

said predetermined waveform signal comprises an FCCH burst waveform.

21. A system according to claim 14, wherein:

said cellular wireless network comprises a CDMA network, and the received composite signals share a common pilot number utilized by said CDMA network.

22. A system according to claim 14, wherein:

data representing relative power level for a given correlation peak is derived from the magnitude of the received composite signal level at one or more sample points corresponding to the given correlation peak.

23. A system according to claim 15, further comprising:

means for generating data representing estimated location for a given source identifier based upon time-of-arrival data and location data associated with a plurality of correlation peaks corresponding to the given source identifier.

24. A system according to claim 23, further comprising:

a GPS unit that generates an output position signal from which the location data associated with a given correlation peak is derived.

25. A system according to claim 14, further comprising:

a GPS unit that generates an output timing signal from which said synchronous time reference signals are derived.

26. A system according to claim 25, further comprising:

a crystal oscillator circuit that is synchronized to the output timing signal generated by the GPS unit, wherein the crystal oscillator circuit generates a timing reference signal from which is derived time-of-arrival data for a portion of said second set of correlation peaks.

27. A system according to claim 14, wherein:

said first set of composite signals are measured and recorded by at least one wireless data acquisition device as part of a ground level survey of the cellular wireless network, and said second set of composite signals are measured and recorded by at least one wireless data acquisition device as part of an above-ground level survey of the cellular wireless network.

* * * * *